United States Patent [19]

Morehart et al.

[11] Patent Number: 5,484,005
[45] Date of Patent: Jan. 16, 1996

[54] PNEUMATIC TIRE WITH AIR RETENTION CARCASS

[75] Inventors: Christine L. Morehart, North Canton; Frederick J. Ravagnani, Uniontown, both of Ohio

[73] Assignee: Bridgestone Corporation, Tokyo, Japan

[21] Appl. No.: 333,938

[22] Filed: Nov. 3, 1994

Related U.S. Application Data

[63] Continuation of Ser. No. 998,359, Dec. 30, 1992, abandoned.

[51] Int. Cl.$^6$ ............................ B60C 1/00; B60C 5/12; B60C 9/02; B60C 9/04
[52] U.S. Cl. ............................ 152/564; 152/510; 152/565
[58] Field of Search .................................. 152/564, 510, 152/565; 524/460, 394, 397, 517, 187; 525/74, 76, 80

[56] References Cited

U.S. PATENT DOCUMENTS

| | | | |
|---|---|---|---|
| 3,586,087 | 6/1971 | Messerly et al. | 152/510 |
| 3,712,360 | 1/1973 | Torti et al. | 152/564 |
| 3,838,108 | 9/1974 | Hergenrother et al. | 528/60 |
| 3,845,163 | 10/1974 | Murch | 525/183 |
| 3,869,418 | 3/1975 | Peterson et al. | 524/460 |
| 4,117,036 | 9/1978 | Honda et al. | 524/13 |
| 4,174,358 | 11/1979 | Epstein | 525/184 |
| 4,616,686 | 10/1986 | Berta | 152/510 |
| 4,725,649 | 2/1988 | Hoshino | 152/510 |
| 5,093,418 | 3/1992 | Kinoshita et al. | 525/64 |
| 5,093,426 | 3/1992 | Sakabe et al. | 525/223 |
| 5,122,569 | 6/1992 | Scheibelhoffer et al. | 525/179 |

FOREIGN PATENT DOCUMENTS

| | | | |
|---|---|---|---|
| 2051270 | 3/1992 | Canada | 152/564 |
| 0475733 | 3/1992 | European Pat. Off. | 152/510 |
| 3924531 | 2/1991 | Germany | 152/564 |

*Primary Examiner*—Adrienne C. Johnstone
*Attorney, Agent, or Firm*—Frank J. Troy, Sr.

[57] ABSTRACT

A tubeless pneumatic vehicle tire having resistance to air permeability in the absence of an innerliner comprises a tread, one or more reinforcing belts, sidewalls, one or more body plies and beads. The rubber skim of the innermost body ply is formed from a rubber composition which is resistant to air permeability. The rubber composition comprises: (a) from about 10 to about 60 parts by weight of natural rubber; (b) from about 20 to about 30 parts by weight of a halogenated butyl rubber; (c) from about 20 to about 30 parts by weight of epichlorohydrin rubber; and (d) from about 5 to about 50 parts by weight of a metal salt-containing material selected from the group consisting of a metal salt of an unsaturated carboxylic acid and a graft copolymer comprising a diene monomer or copolymer backbone having pendently grafted thereto a polymerized metal salt of an unsaturated carboxylic acid.

9 Claims, No Drawings

PNEUMATIC TIRE WITH AIR RETENTION CARCASS

This is a continuation of application Ser. No. 07/998,359 filed on Dec. 30, 1992 now abandoned.

BACKGROUND OF THE INVENTION

The present invention relates to a tubeless pneumatic vehicle tire which is resistant to air permeability in the absence of a rubber innerliner. More particularly, the present invention relates to a tubeless pneumatic vehicle tire in which the rubber coating of the innermost body ply is formed from a rubber composition which is resistant to air permeability.

Conventional tubeless pneumatic vehicle tires generally contain a relatively large number of separate components including a tread, subtread, undertread, reinforcing belts or belt plies, sidewalls, abrasion strips, beads, bead fillers, one or more body plies and a relatively air impermeable innerliner. In addition, these components have different physical property requirements and therefore require different rubber compounds. It will therefore be readily apparent that the manufacture of a tubeless pneumatic tire is a costly, time consuming, multi-step process which involves the preparation of a number of rubber compounds of differing formulations; the conversion of the rubber compounds into tire components such as treads, sidewalls, body plies, etc by various methods such as extrusion, calendering, milling, etc.; and the assembly of the tire components into tire form by a tire builder. Moreover, while efforts have been and are being made to automate the tire building process, much of the assembly process is still conducted manually by the tire builder.

Accordingly, it will clearly be evident that either a reduction in the number of rubber compounds or the number of tire components or both would result in a significant reduction in the time and costs involved in the manufacture of the tire. As a consequence, those skilled in the tire art have increased their efforts to simplify the tire manufacturing process.

One approach which involves both a reduction in the number of different rubber compounds and tire components is described in published Canadian patent application no. 2,021,778 to Stevens et al having a publication date of Jan. 26, 1991. This published application relates to a pneumatic vehicle tire having a tread strip, a reinforcing belt, two sidewalls, a carcass that is anchored in beads by being looped about bead cores that are pull-resistant and/or resistant to compression, and respective profiled inner elements that are disposed radially outwardly of the bead cores. The application discloses that at least one of the elements of tread strip, sidewalls, profiled inner elements, beads and rubber coatings for the belt, carcass and bead cores is formed of a rubber mixture comprising 30 to 100% by weight of a nitrile group—containing hydrocarbon rubber having a double bond proportion of no greater than 13 per 100 carbon atoms. The application further discloses that the use of this rubber mixture allows one to employ only three rubber compounds in the tire; that due to the extremely high air impermeability of the rubber mixture the conventional rubber innerliner can be eliminated and that certain other components such as belt covers and bead reinforcing inserts can also be eliminated.

Rubber innerliners are utilized in tubeless pneumatic tires because of their high resistance to air permeability. The innerliner is not wrapped around the bead cores but extends from bead to bead covering only the inner periphery of the tire. This is consistent with its basic function which is to prevent permeability of air through other tire components such as body plies, sidewalls, etc. Conventional rubber innerliners are generally composed of highly saturated rubbers such as butyl rubber, halogenated butyl rubbers or blends of butyl rubbers with small amounts (e.g. 10% by weight or less) of natural rubber.

The use of such rubber innerliners in tubeless tires while beneficial in preventing air permeability presents a number of significant disadvantages. Thus, the use of a separate rubber innerliner requires the preparation of an additional rubber compound and the assembly of an additional tire component during the tire manufacturing process. In addition, such rubber innerliners because of the highly saturated nature of the butyl rubbers employed therein generally exhibit minimal adhesion to other tire components. Moreover, the use of a separate rubber innerliner adds approximately 1.5 pounds to the total weight of the tire.

Accordingly, the elimination of the separate rubber innerliner used in tubeless tires while maintaining satisfactory resistance to air permeability would provide significant advantages particularly in reducing labor costs and total tire weight.

SUMMARY OF THE INVENTION

In accordance with the present invention, a tubeless pneumatic vehicle tire which is resistant to air permeability in the absence of a separate rubber innerliner is provided. The tire comprises a tread, one or more reinforcing belts, sidewalls, one or more body plies and beads wherein the rubber coating or skim of the innermost body ply is formed from a rubber composition which comprises: (a) from about 10 to about 60 parts by weight of natural rubber: (b) from about 20 to about 30 parts by weight of a halogenated butyl rubber; (c) from about 20 to about 30 parts by weight of epichlorohydrin rubber; and (d) from about 5 to about 50 parts by weight of a metal salt containing material selected from the group consisting of a metal salt of an unsaturated carboxylic acid and a graft copolymer comprising a diene polymer or copolymer having pendently grafted thereto a polymerized metal salt of an unsaturated carboxylic acid.

DETAILED DESCRIPTION OF THE INVENTION

As indicated, the tubeless pneumatic tire of the invention has acceptable resistance to air permeability in the absence of a separate rubber innerliner. The elimination of the innerliner is achieved in accordance with the invention by using a novel rubber composition to form the rubber coating or skim of the innermost body ply of the tire. The rubber composition of the invention not only provides for acceptable resistance to air permeability but also provides for acceptable adhesion to surrounding rubber stocks and to the tire cord utilized in the body plies. It should be noted that the butyl rubber based compositions conventionally employed as the innerliner could not be used as the rubber coating for body plies due to their minimal adhesion properties to other tire stocks and to tire cord.

As indicated, the rubber composition of the invention comprises specified proportions of: (a) natural rubber; (b) a halogenated butyl rubber; (c) an epichlorohydrin rubber; and (d) a metal salt-containing material selected from the group consisting of a metal salt of an unsaturated carboxylic acid and a graft copolymer comprising a diene polymer or copolymer backbone having pendently grafted thereto a polymerized metal salt of an unsaturated carboxylic acid.

Halogenated butyl rubbers which may be employed in the rubber composition of the invention include any of those conventionally used in rubber innerliners for tires. The preferred halogenated butyl rubbers are chlorobutyl rubber and bromobutyl rubber. A particularly preferred chlorobutyl rubber is a chlorinated copolymer of isobutylene and isoprene having a Mooney viscosity (ML/8/212° F.) of 51–60, unsaturation level of 1.1–1.7 mole percent, and a chlorine content of from 1.1–1.3 percent by weight available from Enjay Chemical Co. under the designation Enjay Butyl HT 10-66.

Epichlorohydrin rubbers which may be employed in the rubber composition include those having chlorine contents of from about 20 to about 40 percent by weight. A preferred epichlorohydrin is one having a chlorine content of 36 percent by weight which is commercially available from Nippon Zeon under the designation H65.

Metal salt-containing materials which may be employed in the rubber composition are metal salts of unsaturated carboxylic acids. The metal salts per se may be included in the rubber composition or they may be included as part of a graft copolymer comprising a diene polymer or copolymer backbone having pendently grafted thereto the polymerized metal salt of the unsaturated carboxylic acid.

Unsaturated carboxylic acids which may be used to form the metal salt are alpha, beta-ethylenically unsaturated carboxylic acids having from 3 to 8 carbon atoms such as acrylic, methacrylic, cinnamic and crotonic acids of which acrylic and methacrylic acids are preferred. Suitable metal ions which may be used to form the metal salts include sodium, potassium, magnesium, calcium, zinc, barium, aluminum, tin, zirconium, lithium and cadmium of which zinc and magnesium are preferred. The metal ion is preferably introduced in the form of the salt of the carboxylic acid. A particularly preferred metal salt is zinc dimethacrylate.

Diene polymers or copolymers which may comprise the backbone of the graft copolymer include homopolymers of conjugated dienes and copolymers of conjugated dienes and vinyl aromatic hydrocarbons. Suitable diene monomers which can be used to form the homopolymers or copolymers include 1,3-butadiene, isoprene, 1,3-pentadiene, 2,3-dimethyl-1,3-butadiene, 1,3-hexadiene and the like. The preferred diene monomers are 1,3-butadiene and isoprene. Suitable vinyl aromatic hydrocarbon monomers which can be used to form the copolymers include styrene, alpha-methylstyrene, p-methylstyrene, vinyltoluene, vinylnaphthalene and the like. The preferred vinyl aromatic hydrocarbon monomer is styrene.

The preferred diene polymers for use as the backbone of the graft copolymer are polybutadiene and polyisoprene. The polybutadiene employed is a conventional polybutadiene rubber having a vinyl or 1,2-microstructure content of from about 8 to 12 percent.

The graft copolymer can be prepared by a relatively uncomplicated procedure. Thus, the graft copolymer can be prepared by first dissolving a diene polymer or copolymer such as polyisoprene or polybutadiene or styrene/butadiene copolymer (SBR) in a solvent such as hexane, then adding a metal salt of an unsaturated carboxylic acid such as zinc dimethacrylate to the polymer solution, adding a free radical initiator such as azo-bis-isobutyronitrile to the polymer solution and then heating the reaction mixture at a temperature of from about 40° to about 150° C. for a time period of from about 0.1 to about 100 hours to produce the graft copolymer. A more detailed description of the method for preparing the graft copolymer herein is set forth in copending U.S. application Ser. No. 08/333,120, commonly assigned to the same assignee herein, filed on an even date herewith; the disclosure of which is incorporated herein by reference.

The graft copolymer employed in the rubber composition of the invention contains from about 20 to about 40 percent by weight of the zinc dimethacrylate or other metal salt and from about 60 to 80 percent by weight of the diene polymer or copolymer.

As set forth above, the rubber compositions of the invention comprise: (a) from about 10 to about 60 parts by weight of natural rubber; (b) from about 20 to about 30 parts by weight of halogenated butyl rubber; (c) from about 20 to about 30 parts by weight of epichlorohydrin, and (d) from about 5 to about 50 parts by weight of metal salt-containing material selected from the group consisting of a metal salt of an unsaturated carboxylic acid and a graft copolymer comprising a diene polymer or copolymer backbone having pendently grafted thereto a metal salt of an unsaturated carboxylic acid. A preferred rubber composition of the invention comprises 50 parts by weight of natural rubber, 25 parts by weight of chlorobutyl rubber, 25 parts by weight of epichlorohydrin and 15 parts by weight of zinc dimethacrylate.

The rubber compositions of the invention may also contain conventional rubber additives such as carbon black, fillers, plasticizers, antioxidants, curing agents, curing accelerators and the like. Rubber compositions containing the rubber additives may be prepared by compounding or mixing the rubbers and rubber additives using standard rubber mixing equipment and procedures. The rubber compositions are coated on tire cord such as polyester or steel cord using conventional procedures such as calendering or extrusion. The rubber compositions may be vulcanized using conventional rubber vulcanization conditions.

The following examples are submitted for the purpose of further illustrating the nature of the present invention and should not be regarded as a limitation on the scope thereof. Parts and percentages shown in the examples are by weight unless otherwise indicated.

EXAMPLES 1–2

In these examples, body stock compounds containing the rubber compositions of the invention were prepared and evaluated for properties. For comparative purposes, a butyl rubber based innerliner compound was prepared to serve as a control and evaluated for the same properties.

The body stock compounds had the following formulations:

| Examples | Control | 1 | 2 |
|---|---|---|---|
| Natural rubber | 10.00 | 50.00 | 50.00 |
| Chlorobutyl rubber | 90.00 | 25.00 | 25.00 |
| epichlorohydrin | — | 25.00 | 25.00 |
| GPF carbon black* | 70.00 | 40.00 | 40.00 |
| Clay | — | 30.00 | 30.00 |
| stearic acid | 2.00 | 1.00 | 1.00 |
| zinc oxide | 3.00 | 2.25 | 2.25 |
| lubricant | 11.00 | 4.00 | 4.00 |
| tackifier | 10.00 | 2.00 | 2.00 |
| barium carbonate | — | 1.25 | 1.25 |
| zinc dimethacrylate | — | 15.00 | 15.00 |

-continued

| Examples | Control | 1 | 2 |
|---|---|---|---|
| 2,4,6 trimercapto-s-triazine | — | 0.30 | 0.60 |
| activator | 1.3 | 1.00 | 2.00 |
| benzothiazyldisulfide | — | 1.13 | 1.13 |
| sulfur | 0.5 | 0.38 | 0.38 |
|  | 198.80 | 198.31 | 199.61 |

*GPF = general purpose furnace carbon black

The rubber compounds were mixed using conventional rubber mixing equipment and procedures. Samples of the rubber compounds were tested for stock to stock adhesion, stock to body ply cord adhesion and air permeability.

Stock to stock adhesion involved testing the adhesion of each rubber compound to itself, to a standard abrasion gum strip compound and to a standard sidewall compound.

The general procedure used to prepare the adhesion pads and conduct the adhesion test was as follows:

A first ply of 7×7 inch calendered polyester backing was prepared. A second ply of 7×7 inch calendered polyester fabric backing having cords running in the opposite direction from the cord direction of the first ply was applied to the first ply. A third ply of test stock milled into 7×7 inch sheets having a thickness of about 50 mils was applied to the second ply. A sheet of Holland cloth 3¼×6½ inches was applied to the third ply to provide an unadhered portion of the test strip for clamping in the test machine. A fourth ply of test stock milled into a 7×7 inch sheet having a thickness of about 50 mils was applied to the third ply. A fifth ply of 7×7 inch calendered polyester fabric backing was then applied to the fourth ply with the cords running in the same direction as in the second ply. A sixth ply of 7×7 inch calendered polyester fabric backing was then applied to the fifth ply with the cords running in the same direction as the first ply.

The resulting test pad was then clicked in a machine to produce a pad approximately 6×6 inches in dimension. The pad was then wrapped in Holland, inserted into a 6×6 inch mold and cured for 15 minutes at 375° F. under a pressure of about 300 psi. The cured pad was cut into test strips approximately 1 inch in width, each strip was clamped in an Instron test machine and tested for peel adhesion. The adhesion test was conducted in accordance with procedure set forth in ASTM D413-82. Results are reported in pounds force per inch (lbs/in). After the test is completed, the test strips are examined to determine whether the failure mode is interfacial (I), indicating that the separation occurred at the interface of the test stocks, or jagged (J), indicating cohesive tearing into the bulk of either or both of the test stocks or failed to backing (B).

The general procedure for testing adhesion of the rubber compounds to body ply cord was as follows:

Samples of 1300 denier/2 ends per inch polyester cord treated with a conventional dip are placed in a mold and covered with a thin sheet of test stock. The samples are cured and cut into strips for testing. Each cured test strip has seven cords of which the two end cords are cut and not tested. The test strips are clamped in an Instron type machine and the average force obtained by pulling the cords over an established length is divided by the number of cords. The adhesive strength is reported in kilogram force per cord. The cords are then examined to determine the extent of rubber coverage remaining on the cords.

The general procedure for testing air permeability of the rubber compounds was as follows:

Samples of cured rubber sheets approximately 5 inches in diameter and 20 mils in thickness are clamped in stainless steel cells equipped with air inlet valves. The stainless steel cells are placed in a mineral oil bath maintained at a temperature of 65° C. The cells are attached through their inlet valves to the manifold of an external air cylinder which supplies air at a pressure of 48 psi and by means of hypodermic tubing to a rotary valve which in turn is attached to a data monitor consisting of an electronic pressure transducer. The main valve of the air cylinder is turned on and the pressure inlet valves of the cells are slowly opened. The system is then allowed to equilibrate for about 3 hours. When ready to begin testing, the rotary valve is turned to the cell of interest. The change in pressure in the cell caused by permeation of air through the test stock is determined by changes in voltage during the test. Using this data along with the known cell volume, the sample thickness and the average permeation time, a permeation coefficient Q can readily be determined. The test results are reported in terms of the permeation coefficient Q and in this test lower values of Q indicate better resistance to air permeation.

Test conditions and results are shown in Table I.

TABLE I

| Ex. | Innerliner Control | 1 | 2 |
|---|---|---|---|
| Stock to Stock adhesion (Pads cured 15'@375° F.) lbs/in (Failure mode) | | | |
| to itself | 95 (I)[1] | 150 (J)[2] | 88 (J) |
| to abrasion gum strip | 50 (I) | 63 (I/J) | 65 (J) |
| to Sidewall | 43 (I) | 72 (I/J) | 76 (J) |
| Rubber to cord adhesion at R.T. (cured 20'@320° F.) Kg/cord (coverage) to 1300/2 polyester with conventional Dip | 1.2 (E)[5] | 2.3 (B)[4] | 2.0 (A–B)[3] |
| Air Permeability @65° C. $Q^{(6)}$ | 3.5 to 4.5 | 7 | 5 |

[1] I = Interfacial
[2] J = Jagged
[3] A = 95 to 100% coverage
[4] B = 70 to 95% coverage
[5] E = less than 10% coverage
[6] Q = permeation coefficient - lower is better. A coefficient value of 10 or less indicates that the compound has acceptable resistance to air permeability.

As indicated by the above data, the rubber compositions of the invention have good stock to stock adhesion, good rubber to cord adhesion and acceptable resistance to air permeability.

EXAMPLES 3–4

These examples illustrate body stock compounds formed from rubber compositions of the invention containing zinc dimethacrylate grafted polyisoprene (hereafter $Zn(MA)_2PI$).

The body stock compounds had the following formulations:

| Examples | 3 | 4 |
|---|---|---|
| natural rubber | 20.00 | 14.00 |
| bromobutyl rubber | 25.00 | 25.00 |

-continued

| Examples | 3 | 4 |
|---|---|---|
| epichlorohydrin | 25.00 | 25.00 |
| Zn(MA)$_2$ PI[1] | 45.00 | — |
| Zn(MA)$_2$ PI[2] | — | 45.00 |
| GPF carbon black | 40.00 | 40.00 |
| clay | 30.00 | 30.00 |
| stearic acid | 1.00 | 1.00 |
| zinc oxide | 2.25 | 2.25 |
| lubricant | 4.00 | 4.00 |
| tackifier | 2.00 | 2.00 |
| barium carbonate | 1.25 | 1.25 |
| 2,4,6-trimercapto-s-triazine | 0.30 | 0.30 |
| activator | 1.00 | 1.00 |
| benzothiazyldisulfide | 1.13 | 1.13 |
| sulfur | 0.38 | 0.38 |
| Total | 198.31 | 192.31 |

[1]contains 30 parts phr of polyisoprene and 15 phr of zinc dimethacrylate
[c]contains 36 phr of polyisoprene and 9 phr of zinc dimethacrylate The above compounds were mixed and tested for stock to stock adhesion and stock to body ply cord adhesion as set forth in Examples 1–2 above.

Tests, test conditions and test results are shown in Table II.

TABLE II

| Ex. | 3 | 4 |
|---|---|---|
| Stock to stock adhesion (pads cured 15'@375°) lbs/in (Failure mode) | | |
| to itself | 100 (J) | 136 (J) |
| to abrasion gum strip | 75 (J) | 63 (J) |
| to sidewall | 91 (J) | 94 (J) |
| Rubber to cord adhesion at R.T. (cured 20'@320° F.) lbs/in Kg/cord (coverage) to 1300/2 polyester with conventional dip | 2.3 (A) | 2.4 (A) |

We claim:

1. A tubeless pneumatic tire having no separate innerliner ply and having acceptable resistance to air permeability in the absence of an innerliner comprises a tread, one or more reinforcing belts, sidewalls, one or more body plies and beads; wherein the rubber skim of the innermost body ply is formed from a rubber composition comprising:

(a) from about 10 to about 60 parts by weight of natural rubber;

(b) from about 20 to about 30 parts by weight of halogenated butyl rubber:

(c) from about 20 to about 30 parts by weight of epichlorohydrin rubber; and (d) from about 5 to about 50 parts by weight of a metal salt-containing material selected from the group consisting of a metal salt of an unsaturated carboxylic acid and a graft copolymer comprising a diene polymer or copolymer backbone having pendently grafted thereto a polymerized metal salt of an unsaturated carboxylic acid.

2. The tire of claim 1 wherein said halogenated butyl rubber is selected from the group consisting of chlorobutyl rubber and bromobutyl rubber.

3. The tire of claim 1 wherein said epichlorohydrin rubber has a chlorine content of from about 20 to about 40 percent by weight.

4. The tire of claim 1 wherein said metal salt-containing material is a metal salt of an alpha, beta-ethylenically unsaturated carboxylic acid.

5. The tire of claim 4 wherein said metal salt is zinc dimethacrylate.

6. The tire of claim 1 wherein said metal salt-containing material is a graft copolymer comprising a diene polymer or copolymer backbone having pendently grafted thereto a polymerized metal salt of an unsaturated carboxylic acid.

7. The tire of claim 6 wherein said graft copolymer contains from about 20 to about 40 percent by weight of said metal salt and from about 60 to about 80 percent by weight of said diene polymer or copolymer.

8. The tire of claim 6 wherein said graft copolymer is a zinc dimethacrylate grafted polybutadiene.

9. The tire of claim 6 wherein said graft copolymer is a zinc dimethacrylate grafted polyisoprene.

* * * * *